United States Patent
McCoy et al.

(10) Patent No.: US 9,815,509 B2
(45) Date of Patent: Nov. 14, 2017

(54) FIFTH WHEEL HITCH RETENTION SYSTEM

(75) Inventors: Richard W. McCoy, Granger, IN (US);
Eric J. Stanifer, Mishawaka, IN (US);
Newly Mach, South Bend, IN (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 13/190,917

(22) Filed: Jul. 26, 2011

(65) Prior Publication Data

US 2012/0018978 A1 Jan. 26, 2012

Related U.S. Application Data

(60) Provisional application No. 61/367,702, filed on Jul. 26, 2010.

(51) Int. Cl.
| | |
|---|---|
| *B62D 53/10* | (2006.01) |
| *B60D 1/28* | (2006.01) |
| *B62D 53/08* | (2006.01) |
| *B62D 53/12* | (2006.01) |

(52) U.S. Cl.
CPC .............. *B62D 53/10* (2013.01); *B60D 1/28* (2013.01); *B62D 53/08* (2013.01); *B62D 53/12* (2013.01)

(58) Field of Classification Search
CPC ........ B62D 53/08; B62D 53/10; B62D 53/12; B60D 1/015; B60D 1/28
USPC .......................... 280/433–436, 508, 512, 513
See application file for complete search history.

(56) References Cited

U.S. PATENT DOCUMENTS

| | | | | |
|---|---|---|---|---|
| 844,522 | A | * | 2/1907 | Johnson ....................... 280/508 |
| 1,240,818 | A | * | 9/1917 | Buller .......................... 280/483 |
| 2,230,242 | A | * | 2/1941 | Goodrich ..................... 280/508 |
| 2,859,995 | A | * | 11/1958 | Rigaud .......................... 292/53 |
| 2,907,583 | A | * | 10/1959 | Dalton ......................... 280/435 |
| 2,977,137 | A | * | 3/1961 | Durham ....................... 280/434 |
| 3,346,223 | A | * | 10/1967 | Broling ......................... 410/63 |
| 3,539,202 | A | * | 11/1970 | Nelson ......................... 280/434 |
| 4,447,070 | A | * | 5/1984 | Inoue ........................... 280/434 |
| 4,721,323 | A | * | 1/1988 | Czuk et al. ................... 280/433 |
| 4,826,199 | A | * | 5/1989 | Chambers .................... 280/434 |
| 4,928,987 | A | * | 5/1990 | Hunger ........................ 280/435 |
| 4,962,945 | A | * | 10/1990 | Vannoy et al. .............. 280/508 |
| 5,257,796 | A | * | 11/1993 | Thorwall et al. ............ 280/434 |
| 5,472,223 | A | * | 12/1995 | Hawthorne et al. ......... 280/437 |
| 5,516,137 | A | | 5/1996 | Kass et al. |
| 5,529,329 | A | | 6/1996 | McCoy |
| 5,988,665 | A | * | 11/1999 | Terry et al. ................... 280/434 |

(Continued)

FOREIGN PATENT DOCUMENTS

CA 2439710 3/2004

OTHER PUBLICATIONS

Supplementary European Search Report, Cequent Performance Products, Inc., Dec. 14, 2011.

*Primary Examiner* — Joseph M Rocca
*Assistant Examiner* — Maurice L Williams
(74) *Attorney, Agent, or Firm* — McDonald Hopkins LLC

(57) ABSTRACT

A fifth wheel hitch may include a skid plate, and a retention system that is supported by the skid plate. The retention system is also operable to receive a coupling member of a towed vehicle to retain the coupling member within the retention system, where engagement of the coupling member with the retention system selectively positions the retention system in a locked and closed position.

27 Claims, 11 Drawing Sheets

(56) References Cited

U.S. PATENT DOCUMENTS

| | | | |
|---|---|---|---|
| 6,467,793 B2* | 10/2002 | Putnam | 280/508 |
| 6,908,093 B1* | 6/2005 | Putnam | 280/435 |
| 7,384,056 B2* | 6/2008 | Anderson | 280/441 |
| 7,735,849 B1* | 6/2010 | Mann | 280/433 |
| 2003/0015855 A1* | 1/2003 | McCoy et al. | 280/433 |
| 2004/0070170 A1 | 4/2004 | Lindenman et al. | |
| 2006/0220344 A1* | 10/2006 | Kahrs et al. | 280/433 |
| 2007/0235980 A1* | 10/2007 | Crawley | 280/435 |
| 2008/0067781 A1* | 3/2008 | Shirk | 280/433 |
| 2011/0042920 A1* | 2/2011 | Mann | 280/434 |

* cited by examiner

FIFTH WHEEL HITCH RETENTION SYSTEM

CROSS-REFERENCE TO RELATED APPLICATION

This application claims benefit from U.S. Provisional Patent Application No. 61/367,702, entitled "Fifth Wheel Hitch Retention System," filed on Jul. 26, 2010, which is hereby incorporated in its entirety by reference.

TECHNICAL FIELD

The present invention generally relates to a fifth wheel hitch and, more particularly, to a retention mechanism for a fifth wheel hitch.

BACKGROUND

The towing industry has developed a number of methods and apparatuses for securing a towed vehicle or trailer to a towing vehicle. For example, hitch balls have been developed to be attached to the bumper or other rear portion of a towing vehicle. A trailer or towed vehicle equipped with a coupler mechanism may be attached to the towing vehicle by placing the coupling mechanism over the hitch ball and securing the coupler to the ball. Similar apparatus using hitch receivers attached to the rear of a towing vehicle and drawbars may be used to secure trailers to towing vehicles.

Some trailers may be designed to carry heavy loads. Connecting such a trailer to a ball hitch on a bumper of a towing vehicle, however, may be impractical. When a trailer load is heavy when compared to the weight of the towing vehicle, applying the trailer load to the rear of the towing vehicle may cause undesirable towing conditions. In such situations, the trailer may often be secured to a load bed of a towing vehicle, whereby the force of the trailer load is generally applied over or near the rear axle of the towing vehicle to create a potentially more stable towing condition. In addition, such an arrangement may put much of the force of the trailer load onto structural members of the towing vehicle, such as the frame.

There are generally two arrangements for securing a trailer to the load bed of a towing vehicle—a fifth wheel hitch and a gooseneck hitch. A gooseneck hitch is generally attached to a hitch ball that may be located in the load bed of the towing vehicle. The hitch ball may typically be secured to the frame or load bed of the towing vehicle. A fifth wheel hitch may generally be positioned in a load bed of the towing vehicle and secured either to the load bed or directly to the frame of the towing vehicle. Fifth wheel hitches may generally be attached to the load bed or frame whereby tools may generally be required to remove fasteners and other connectors to install or uninstall a fifth wheel hitch to the load bed of a towing vehicle.

Typically, a fifth wheel trailer may include a king pin that may be used to couple the trailer to the towing vehicle. Fifth wheel trailers are commonly coupled to towing vehicles that include a load bed, such as a pick-up truck or a flatbed truck. A fifth wheel hitch assembly may be secured in the load bed of the towing vehicle, whereby the king pin of the trailer is commonly coupled to the fifth wheel hitch assembly.

Fifth wheel hitch assemblies may typically include a support frame for securing the hitch assembly to the load bed of the towing vehicle. The support frame may include a pair of mounting rails, a pair of side brackets, and a head assembly. The mounting rails may be bolted to the load bed or the frame of the towing vehicle. The side brackets may be secured to the mounting rails and the head assembly may be secured to the side brackets. The head assembly may be secured in a manner that allows the head assembly to pivot fore-and-aft with respect to the towing vehicle.

The head assembly may include a jaw assembly for securing the king pin of the trailer to the towing vehicle. The jaws may be moveable to secure and release the king pin extending from the trailer. The jaws may also be arranged such that an operator may manually toggle the jaws between a position in which the king pin is secured in the jaws and a position in which the king pin is released from the jaws. When the king pin is secured in the jaws, the trailer is secured to the towing vehicle and may be towed by the towing vehicle. When the king pin is released from the jaws, the king pin may be removed from the jaws, decoupling the trailer from the towing vehicle.

Fifth wheel hitches may normally be arranged such that the king pin is aligned over or near the rear axle and approximately equidistant between the rear wheels of the towing vehicle. Placing the king pin over the rear axle may also provide for sufficient clearance between the front edge of the trailer and the rear edge of the towing vehicle cabin. Such an arrangement may facilitate towing the trailer at operational speeds, such as highway speeds.

The typical jaw assembly may often require a large vertical space in order to operate. Since these jaw assemblies are not directly locked, the retaining jaws may have a lot of varying movement. Therefore, there is a need to substantially prevent the retaining jaws from varying movement such as through employing a locking device.

SUMMARY

A fifth wheel hitch may include a skid plate, and a retention system that is supported by the skid plate. The retention system is also operable to receive a coupling member of a towed vehicle to retain the coupling member within the retention system, where engagement of the coupling member with the retention system selectively positions the retention system in a locked and closed position.

A fifth wheel hitch may include at least one support frame capable of being secured to a towing vehicle, a skid plate attached to the support frame, and a retention system secured to the skid plate. The retention system may include a handle, a linkage attached to the handle, the linkage permitting rotation of the handle from a first position to a second position while the handle remains fixed about an axis, and a jaw assembly attached to the linkage, where rotation of the handle to the second position permits movement of the jaw assembly to a first jaw position.

A retention system for a fifth wheel hitch assembly may include a handle, a linkage operatively coupled to the handle, a mounting tube attached to the handle, where the mounting tube is capable of being secured to a skid plate of a fifth wheel hitch assembly. The retention system may also include a jaw assembly operatively coupled to the linkage, and a locking mechanism attached to the handle and in operative communication with the jaw assembly, where the locking mechanism is selectively positionable from locked and unlocked positions.

DESCRIPTION OF THE DRAWINGS

The operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
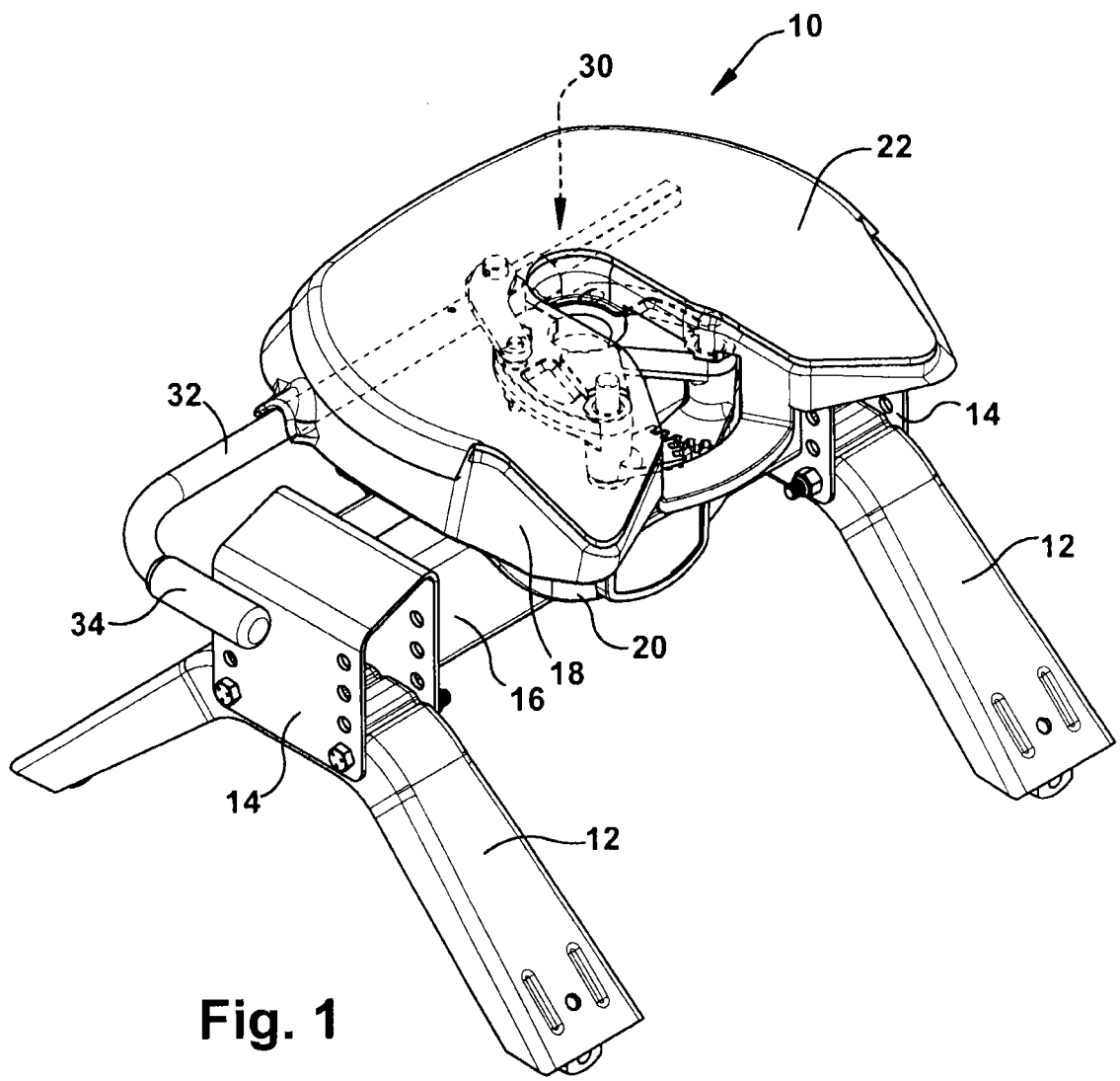
FIG. 1 is a perspective view of a fifth wheel hitch assembly utilizing a retention system according to the present teachings.
Figure 2:
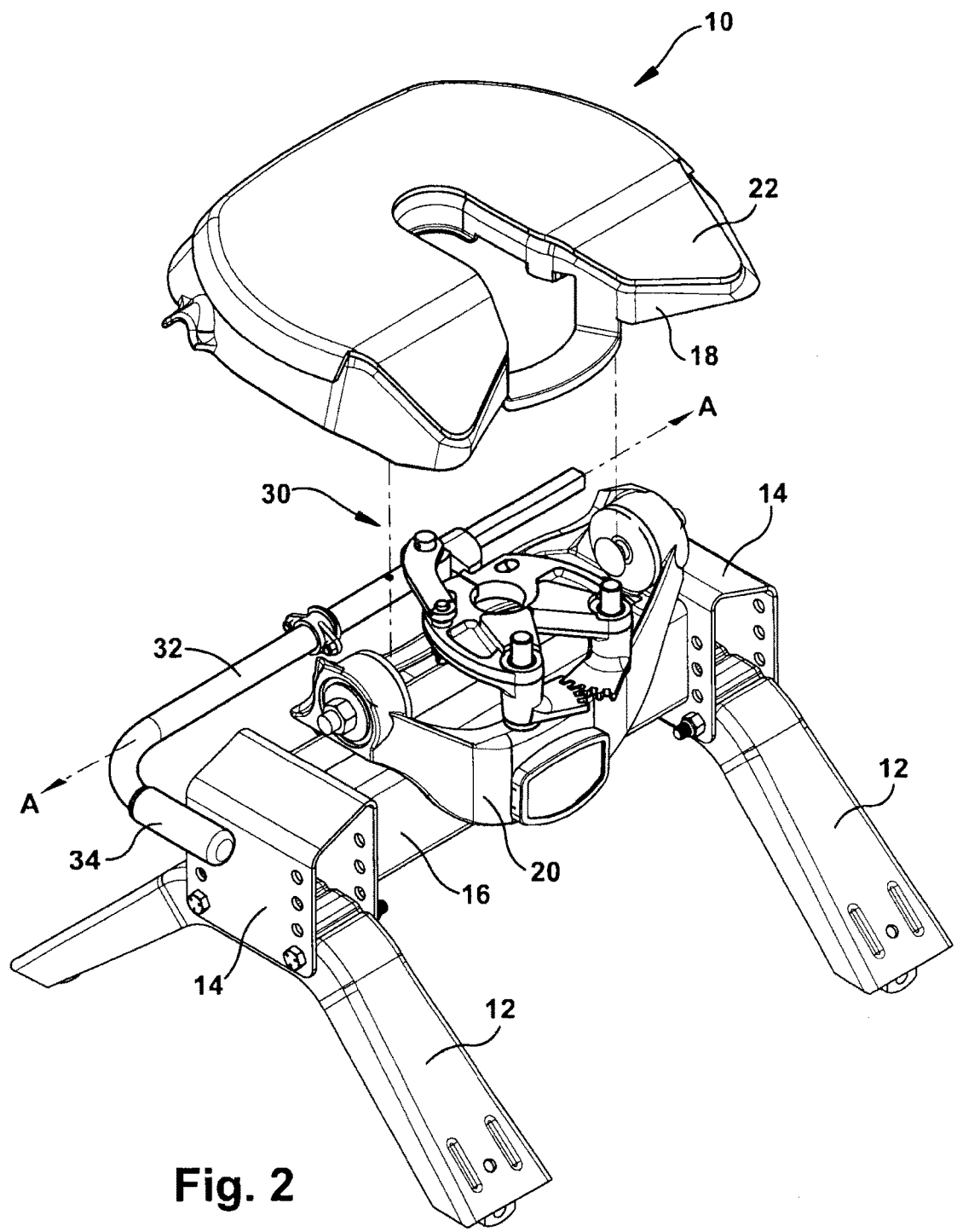
FIG. 2 is a partially exploded perspective view of the fifth wheel hitch assembly of FIG. 1 showing the retention system.

A fifth wheel hitch assembly 10 is shown in FIGS. 1 and 2. The fifth wheel hitch assembly 10 may be positioned in a load bed of a towing vehicle, such as a truck (not shown), and secured either to the load bed or directly to the frame of the truck below the load bed. Once secured to the towing vehicle, a king pin (not shown) of a towed vehicle or trailer (not shown) may be coupled to the fifth wheel hitch assembly 10. The fifth wheel hitch assembly 10 may be fabricated out of any appropriate types of materials, such as metal or the like.

The fifth wheel hitch assembly 10 may include at least one support frame 12, at least one mounting bracket 14 and at least one cross-member 16. By way of a non-limiting example, the fifth wheel hitch assembly 10 may include a pair of support frames 12. The support frames 12 may be of any appropriate shape, size, type or configuration. By way of a non-limiting example, the support frames 12 may be of a generally curved shape, in a substantially arched shaped, or the like.

The support frames 12 may be located at any appropriate position on the fifth wheel hitch assembly 10, such as on each side of the hitch assembly 10. The support frames 12 may be utilized to secure the fifth wheel hitch assembly 10 to the load bed of the towing vehicle. By way of a non-limiting example, the support frames 12 may be secured to the load bed or the frame of the towing vehicle by any appropriate means, such as with fasteners, or the like. More specifically, the support frames 12 may be secured to rails (not shown) that are attached to the frame (not shown) of the towing vehicle below the load bed. In this embodiment, the rails (not shown) may include a plurality of apertures (not shown) below the load bed and the load bed may include correspondingly shaped and positioned apertures (not shown) such that the apertures of the rails may include a fastening device (not shown) such that the support frames 12 may be secured to the fastening device (not shown).

Each support frame 12 may be attached to a mounting bracket 14, whereby the fifth wheel hitch assembly 10 may include a pair of mounting brackets 14. The mounting brackets 14 may be of any appropriate shape, size, type or configuration. By way of a no-limiting example, the mounting brackets 14 may be of a general C-shape or three sided square, rectangular shape, or the like. The mounting brackets 14 may be located at any appropriate position on the fifth wheel hitch assembly 10, such as located above each support frame 12 and adjacent each end of the cross-member 16. The mounting brackets 14 may be utilized to secure the cross-member 16 to the support frames 12.

The cross-member 16 may be of any appropriate shape, size, type or configuration. By way of a non-limiting example, the skid plate 16 may be of a general horseshoe shape, a substantially semi-circular shape, a substantially curved shaped or the like. The cross-member 16 may be located at any appropriate position on the fifth wheel hitch assembly 10, such as located between each support frame 12 and mounting bracket 14. The cross-member 16 may be secured to the mounting brackets 14 by any appropriate means, such as by welding, fasteners, or the like. The cross-member 16 may be utilized to secure a pivot beam 20.

The pivot beam 20 may be of any appropriate shape, size, type or configuration. By way of a non-limiting example, the pivot beam 20 may be of a generally curved or cradle shape, a substantially saddled shape, or any other such shape. The pivot beam 20 may be located at any appropriate position on the fifth wheel hitch assembly 10, such as located between each support frame 12 and mounting bracket 14 and adjacent the cross-member 16, an example of which is shown in FIGS. 1-2. The pivot beam 20 may be secured to the cross-member 16 by any appropriate means, such as with fasteners or the like. The pivot beam 20 may be utilized to secure a head or skid plate 18.

The head or skid plate 18 may be of any appropriate shape, size, type or configuration. For example, the skid plate 18 may be of a general horseshoe shape, a substantially semi-circular shape, a substantially curved shaped or the like. The skid plate 18 may be located at any appropriate position on the fifth wheel hitch assembly 10, such as located above the pivot beam 20. The skid plate 18 may be utilized to engage with the king pin (not shown) of the trailer (not shown).

The fifth wheel hitch assembly 10 may also include a cover 22, an example of which is shown in FIGS. 1 and 2. The cover 22 may be of any appropriate shape, size, type or configuration, such as a generally planar horseshoe shape, substantially semi-circular shape, a substantially curved shaped or the like. For example, the cover 22 may be of a substantially similar shape to that of the skid plate 18. The cover 22 may be located at any appropriate position on the fifth wheel hitch assembly 10, such as located above the skid plate 18.

The fifth wheel hitch assembly 10 may include a retention system 30. The retention system 30 of the fifth wheel hitch assembly 10 is shown in FIGS. 2-11. The retention system 30 may be of any appropriate shape, size, type or configuration. The retention system 30 may be located at any appropriate position on the fifth wheel hitch assembly 10, such as located between the pivot beam 20 and the skid plate 18, an example of which is shown in FIGS. 1-2. The retention system 30 may be utilized to engage with the king pin (not shown) of the trailer (not shown).

The retention system 30 may include a handle 32, a slider 40 and at least one jaw 42, which is shown in FIGS. 3-5, 7, 9-10. The handle 32 may be of any appropriate shape, size, type or configuration. By way of a non-limiting example, the handle 32 may be of a general tubular L-shape, a substantially T-shape, or the like. The handle 32 may be located at any appropriate position on the fifth wheel hitch assembly 10, such as located adjacent the pivot beam 20 and below the skid plate 18. The handle 32 may be utilized to engage the jaws 42 of the retention system 30.

The handle 32 may include a grip 34. The grip 34 may be of any appropriate shape, size, type or configuration. By way of a non-limiting example, the grip 34 may be of a general tubular shape similar to that of the handle 32, such as a general tubular L-shape, a substantially T-shape, or the like. The grip 34 may be located at any appropriate position on the handle 32, such as at an end of the handle 32. The grip 34 may provide the user with a comfortable surface to grip the handle 32 when adjusting the fifth wheel hitch assembly 10, as well as being ergonomically shaped to further attempt to ease the use of the handle 32.

The retention system 30 may include a mounting tube 36. The mounting tube 36 may be of any appropriate shape, size, type or configuration. By way of a non-limiting example, the mounting tube 36 may be of a generally acircular cross-sectional shape, such as for example a generally square tubular shape in cross-section. The mounting tube 36 may be located at any appropriate position on the retention system 30, such as located on the handle 32 adjacent or opposite that of an end of the handle 32. The mounting tube 36 may be utilized to secure the retention system 30 to the fifth wheel hitch assembly 10. The square mounting tube 36 may also maintain the handle 32 in locked and unlocked positions. A detent mechanism may allow for axial movement of handle 32 relative to the fifth wheel hitch assembly 10.

The retention system 30 may also include a linkage 38, an example of which is shown in FIGS. 3, 5, 7, 9 and 10. The linkage 38 may be of any appropriate shape, size, type or configuration. By way of a non-limiting example, the linkage 38 may be of a generally cylindrical shape, although it should not be limited to such. The linkage 38 may be located at any appropriate position on the retention system 30, such as located between the handle 32 and the mounting tube 36. The linkage 38 may be utilized to connect or secure the handle 32 and the mounting tube 36 together.

The linkage 38 may include a post 39. The post 39 may be of any appropriate shape or size, such as a generally smaller cylindrical shape than that of the linkage 38. The post 39 may extend outward from the linkage 38. The post 39 may be utilized to connect or secure the linkage 38, and thereby the handle 32 and slider 40 together.

The slider 40 may be of any appropriate shape, size, type or configuration. By way of a non-limiting example, the slider 40 may be of a generally curved shape. The slider 40 may be located at any appropriate position on the retention system 30, such as located adjacent the handle 32 and linkage 38. The slider 40 may be utilized to engage with the jaw 42. The slider 40 may allow for relative rotation of the handle 32, while remaining axially fixed about an axis A.

The retention system 30 may include any appropriate number of jaws 42, such as, for example, a pair of jaws 42. By way of a non-limiting example, the retention system 30 may include a first jaw 42 and a second jaw 44. The jaws 42, 44 may be of any appropriate shape, size, type or configuration. By way of a non-limiting example, the jaws 42, 44 may be of a general curved or claw shape or the like. The jaws 42, 44 may be located at any appropriate position on the retention system 30, such as located adjacent the slider 40 and handle 32. The jaws 42, 44 may be utilized to engage with the king pin (not shown) of the trailer (not shown).

The first jaw 42 may be secured to the slider 40 by any appropriate means, such as with fasteners or the like. By way of a non-limiting example, the first jaw 42 may be secured to the linkage 40 with a pin 64, such as shown in FIGS. 3, 5, 7, 9 and 10. The pin 64 may be of any appropriate shape, size, type or configuration. The pin 64 may be utilized to secure the slider 40 to the first jaw 42, whereby use of the handle 32 may operate the first jaw 42. The slider 40 may allow for relative rotation of the handle 32, whereby the slider 40 may also move axially with the handle 32. In this manner, axially movement of the handle 32 may cause the jaws 42, 44 to open. Slider 40 may pivot on post 39 and pin 64.

Each jaw 42, 44 may include a flipper 46. The flippers 46 may be of any appropriate shape, size, type or configuration. By way of a non-limiting example, the flippers 46 may be of a general fan shape or the like. The flippers 46 may be located at any appropriate position on the retention system 30, such as located adjacent the first and second jaws 42, 44.

Each flipper 46 may include a plurality of gear teeth 48. The gear teeth 48 may be of any appropriate shape, size, type or configuration. By way of a non-limiting example, the gear teeth 48 may be of a general pointed shape. The gear teeth 48 may be located at any appropriate position on the retention system 30, such as located on an end of the flipper 46.

The gear teeth 48 of one flipper 46 may be utilized to engage with the gear teeth 48 of the other flipper 46, whereby the jaws 42, 44 may be gear 48 driven. By way of a non-limiting example, the gear teeth 48 of the flippers 46 may be intermeshed with one another to control relative movement of the retention system 30. The flippers 46 and gear teeth 48 may be integrally formed with the jaws 42, 44 or may be separate components that may be attached to the jaws 42, 44 in a subsequent operation.

The flippers 46 may be secured to the jaws 42, 44 by any appropriate means, such as with fasteners or the like. By way of a non-limiting example, each jaw 42, 44 may be secured to the flippers 46 with a pin 50. The pin 50 may be of any appropriate shape, size, type or configuration. The pin 50 may be utilized to secure the flippers 46 to the first and second jaws 42, 44. The jaws 42, 44 may each pivot around their respective pin 50. Flippers 46 may rotate with their associated jaws 42, 44.

The retention system 30 may include a locking mechanism 54. The locking mechanism 54 may be of any appropriate shape, size, type or configuration. By way of a non-limiting example, the locking mechanism 54 may be of a general rectangular shape or the like. The locking mechanism 54 may be located at any appropriate position on the retention system 30, such as located on the mounting tube 36 and adjacent the linkage 38.

The retention system 30 may allow for the direct locking of one or both jaws 42, 44 with the locking mechanism 54.

By way of a non-limiting example, the locking mechanism 54 may be utilized to engage with the second jaw 44. The locking mechanism 54 may be directly supported by the skid plate 18 structure.

The second jaw 44 may include a notch 66. The notch 66 may be of any appropriate shape, size, type or configuration. By way of a non-limiting example, the notch 66 may be of a generally rectangular shape or the like. The notch 66 may be located at any appropriate position on the second jaw 44, such as located at an end of the second jaw 44 and adjacent the locking mechanism 54. The notch 66 may be utilized to engage with the locking mechanism 54 while the retention system 30 is in a closed and locked position; an example of which is shown in FIGS. 1-6 and 11.

The retention system 30 may include at least one spring 52. By way of a non-limiting example, the retention system 30 may include a pair of springs 52. The springs 52 may be of any appropriate shape, size, type or configuration. The springs 52 may be located at any appropriate position on the retention system 30, such as located adjacent the jaws 42, 44. The springs 52 may be utilized to bias each jaw 42, 44 to a closed position.

Figure 5:
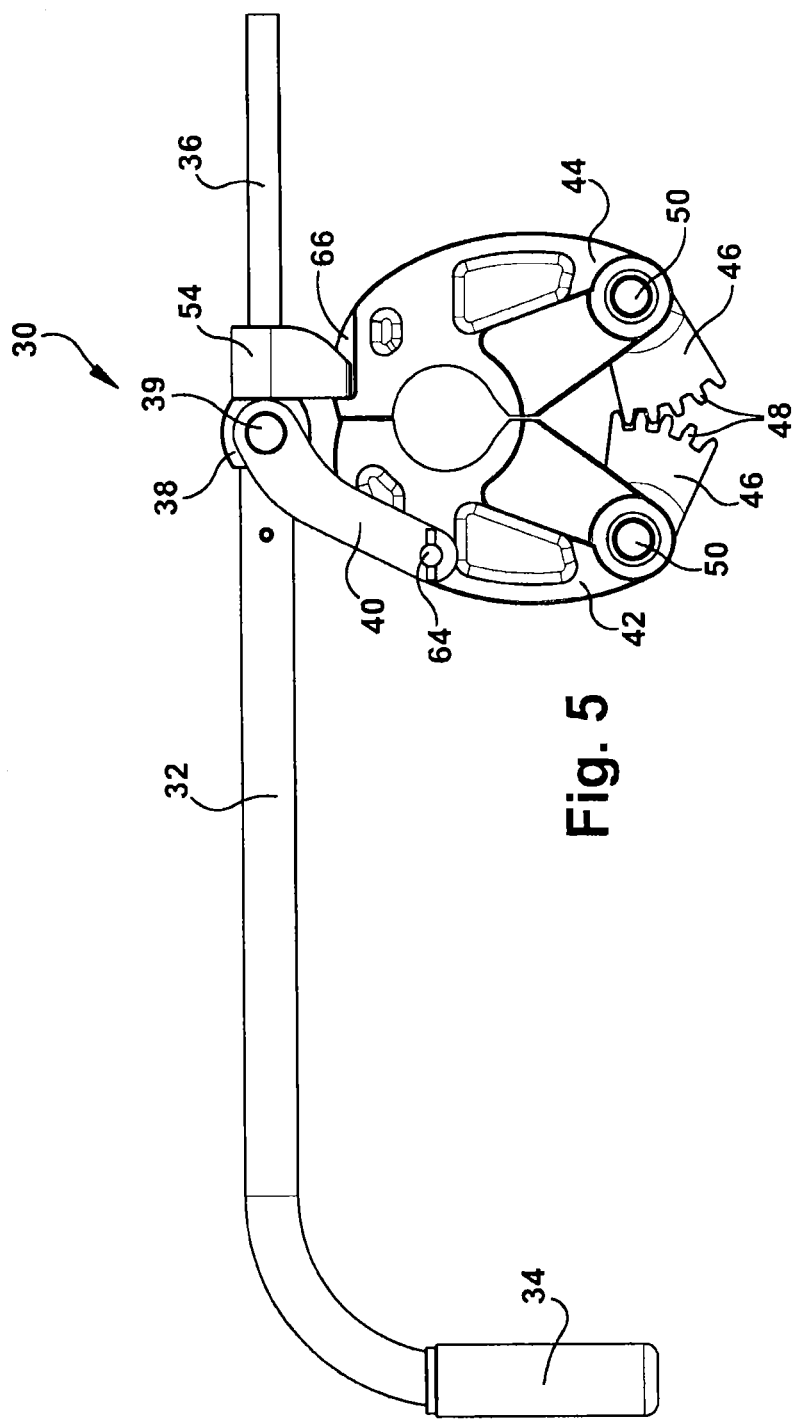
FIG. 5 is a top view of the retention system of FIG. 3 in a locked and closed position.

In use, while the retention system 30 is in the "locked" position, the locking mechanism 54 may be in plane with the second jaw 44, such as engaged with the notch 66, thereby restricting movement. FIG. 5 shows the retention system 30 in the locked position, with only one of the jaws restricted, however, it is to be understood that both jaws 42, 44 may be locked.

Figure 3:
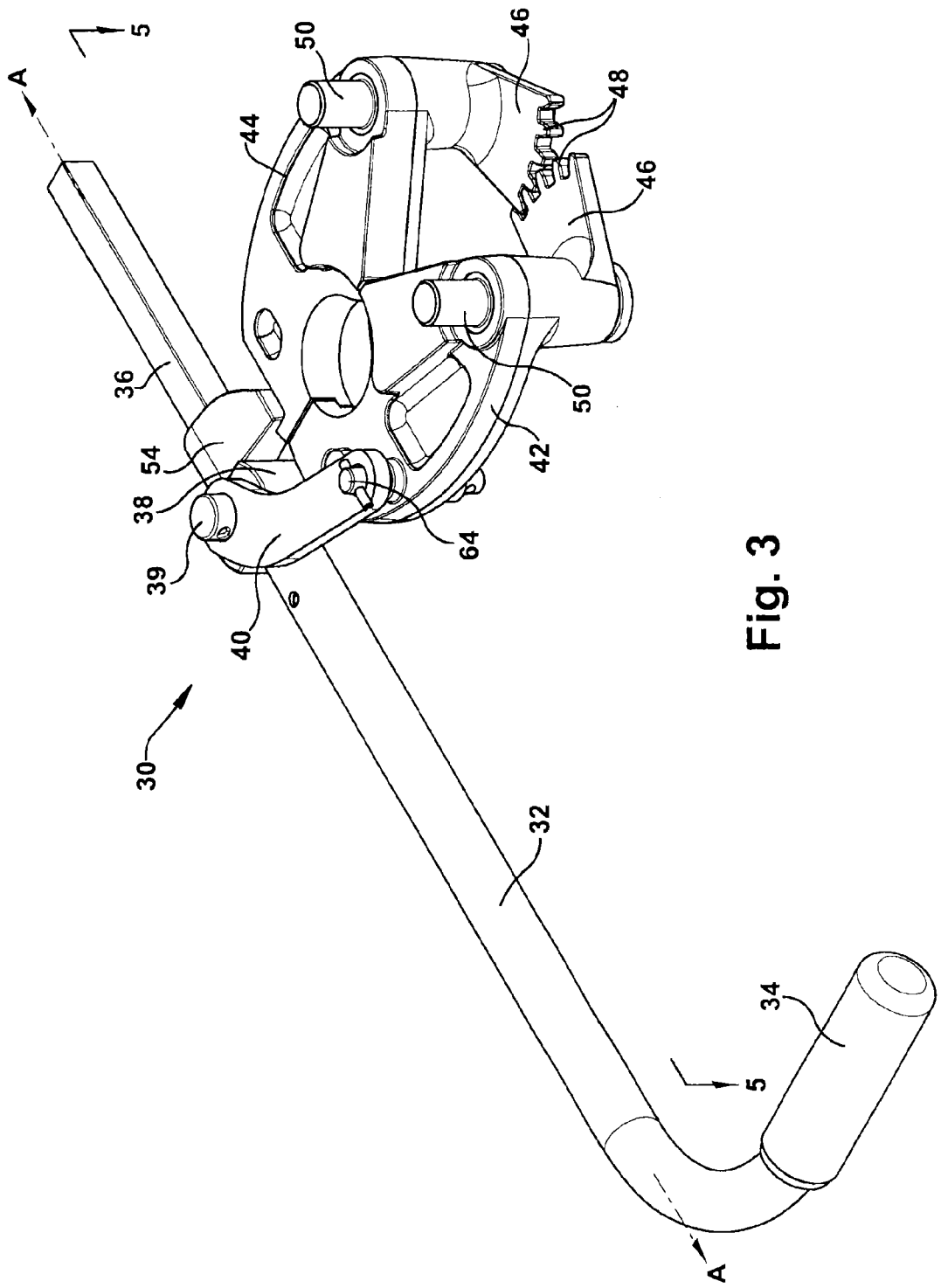
FIG. 3 is a perspective view of the retention system of FIG. 2.
Figure 4:
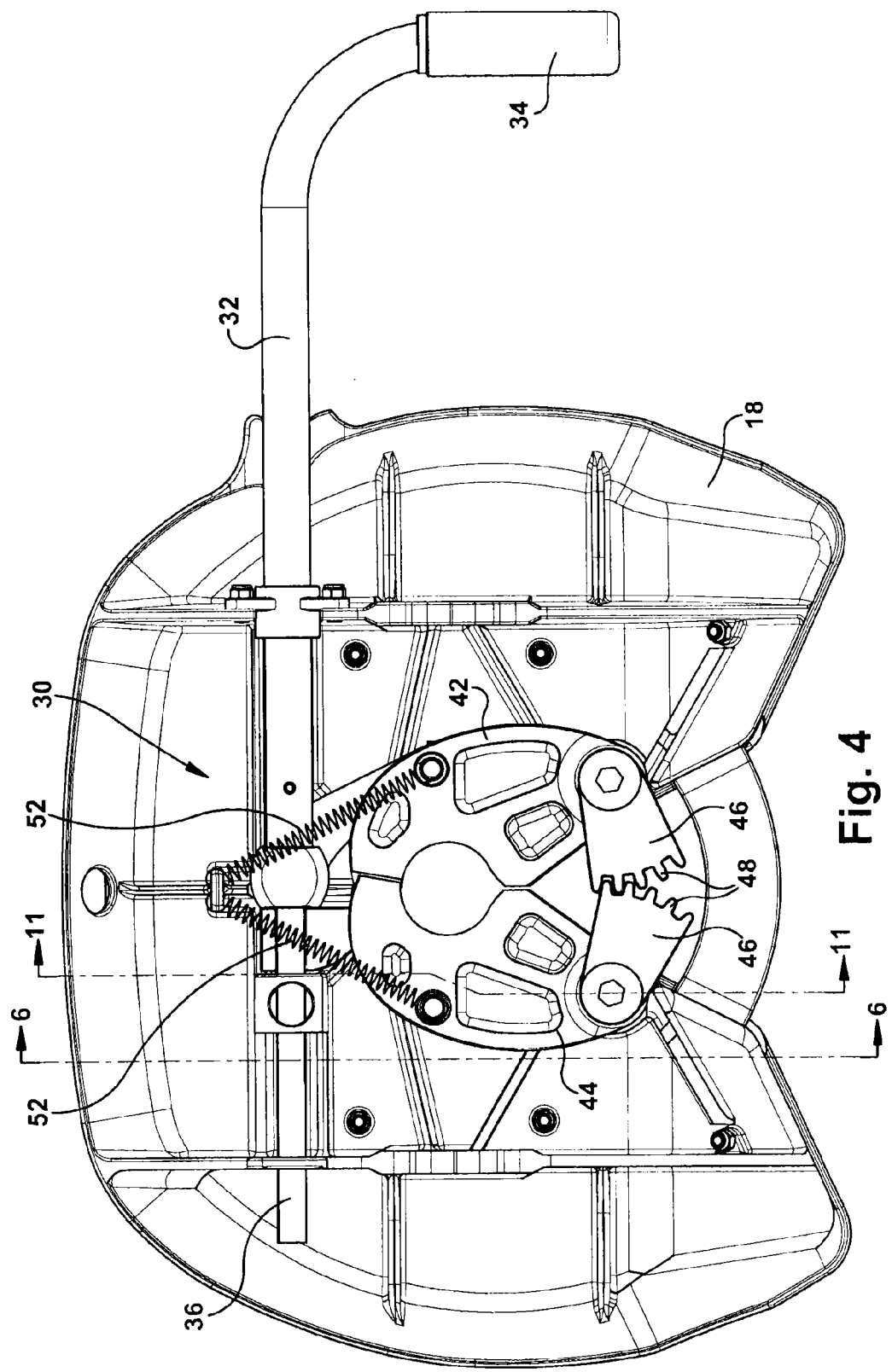
FIG. 4 is a bottom view of the retention system of FIG. 1 in a locked position.
Figure 7:
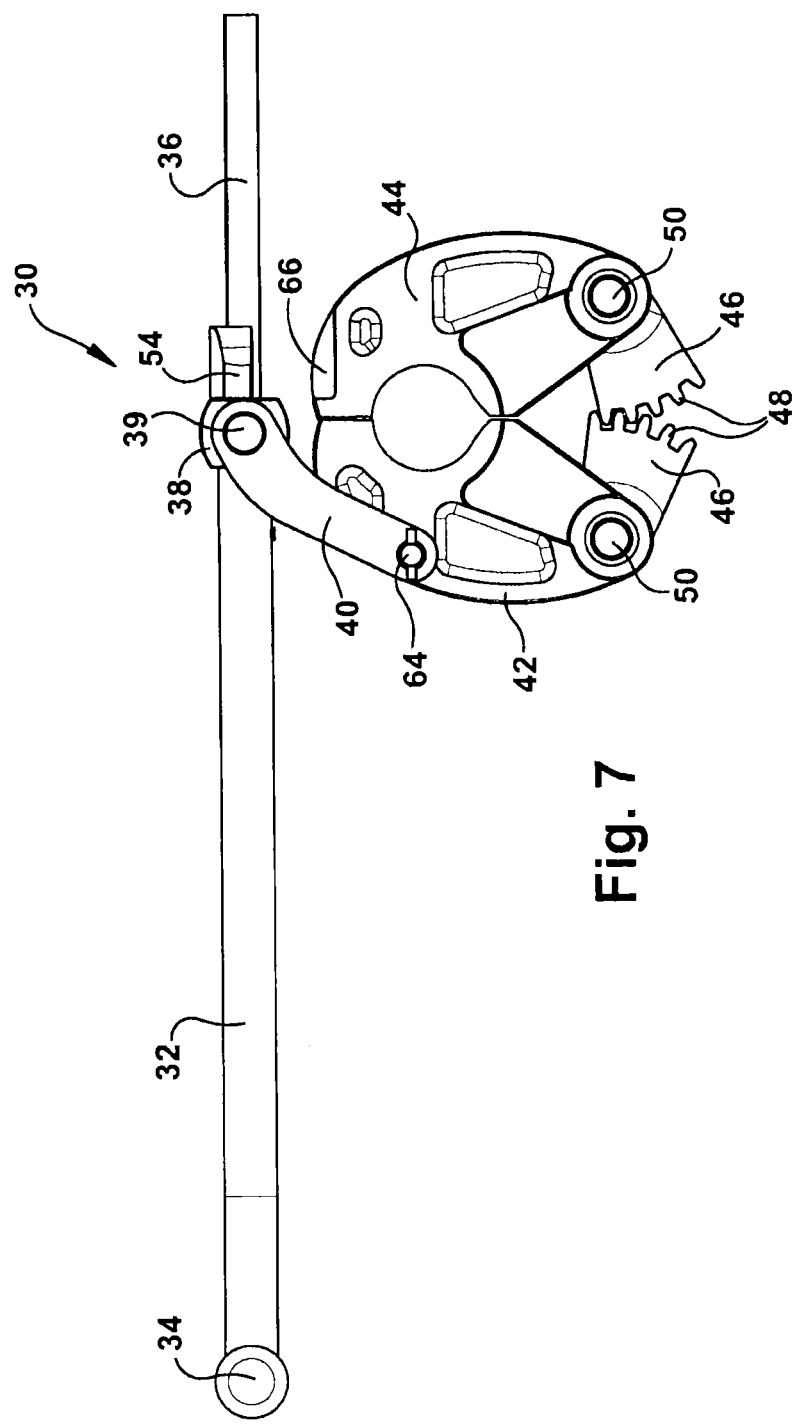
FIG. 7 is a top view of the retention system of FIG. 3 in an unlocked and closed position.
Figure 8:
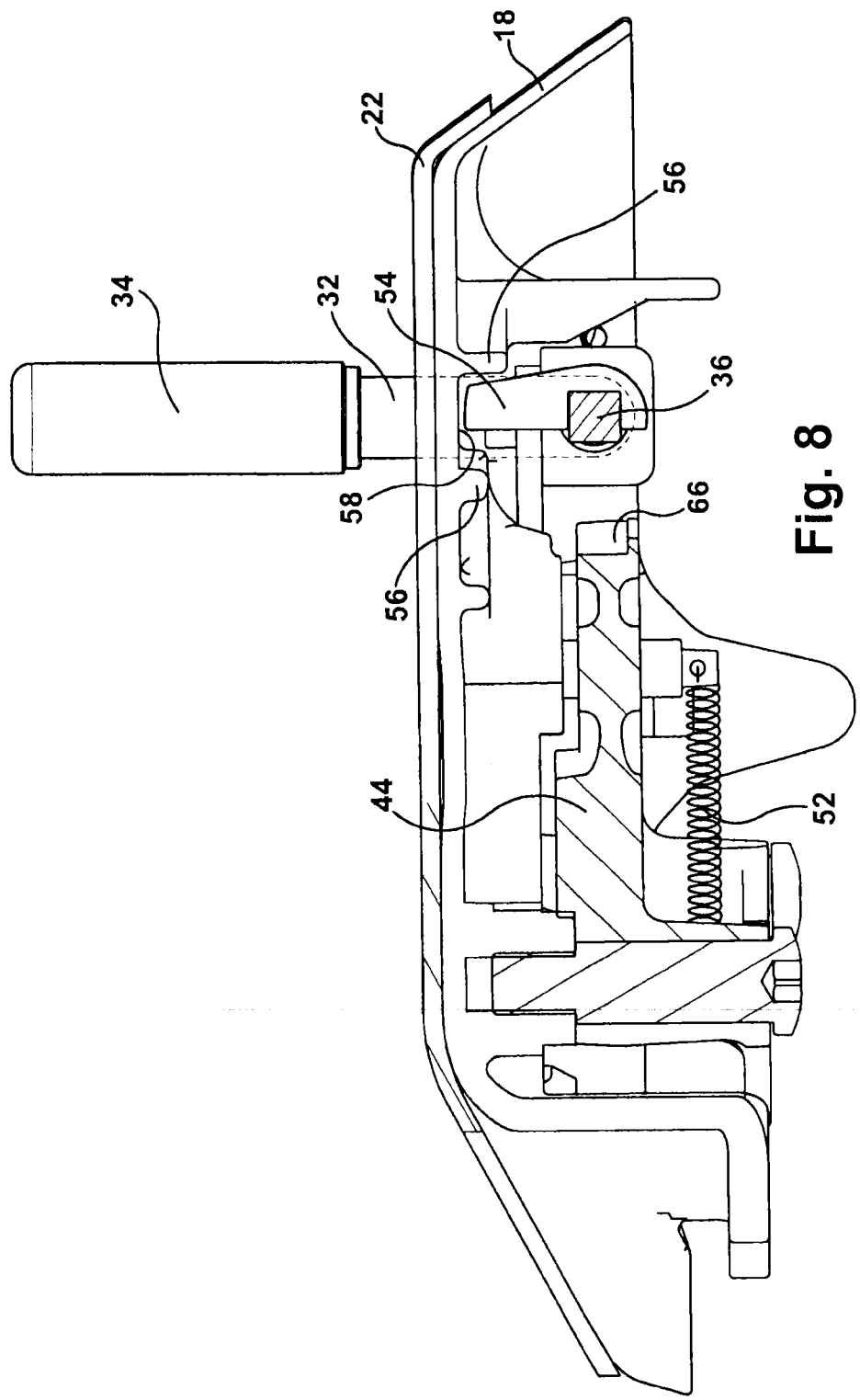
FIG. 8 is a cross-sectional side view of the retention system in an unlocked position.
Figure 9:
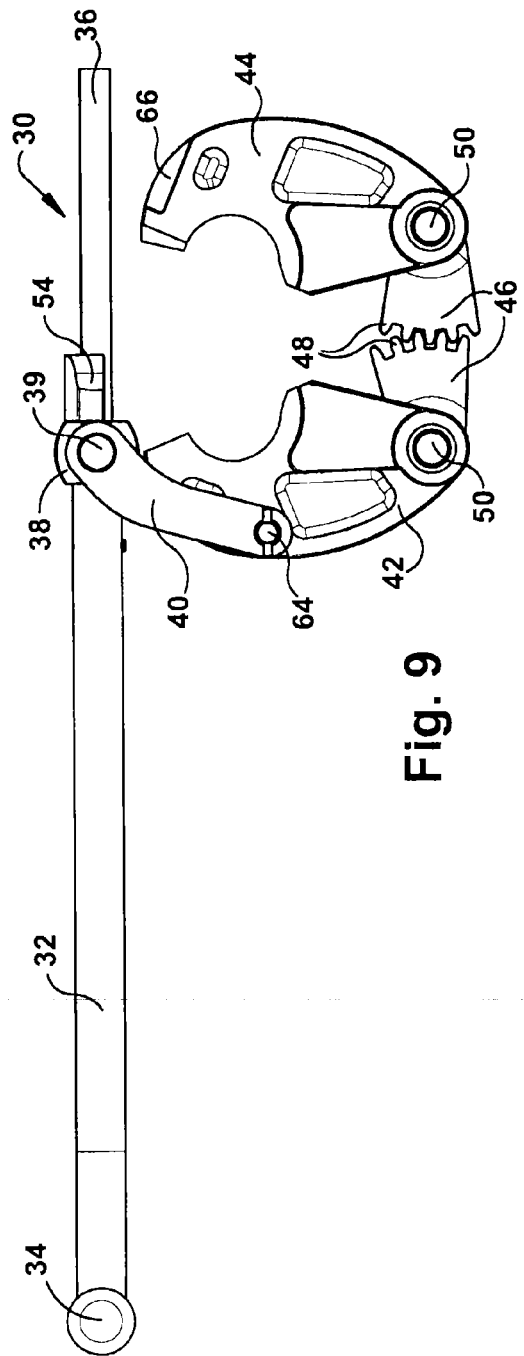
FIG. 9 is a top view of the retention system of FIG. 3 in an unlocked and partially open position.
Figure 10:
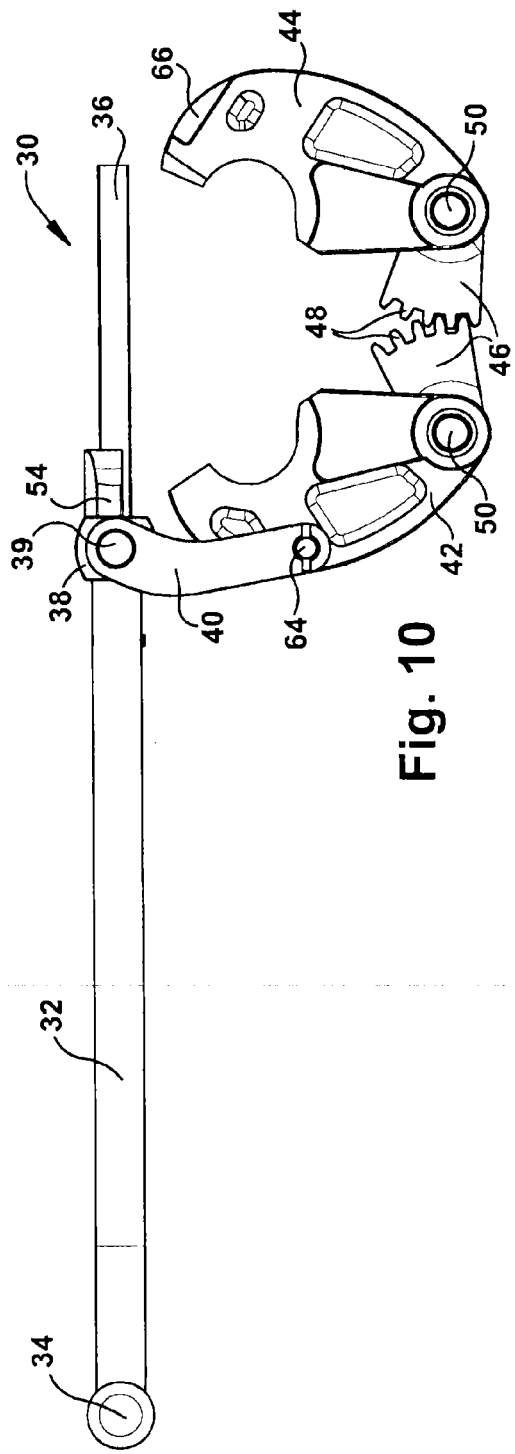
FIG. 10 is a top view of the retention system of FIG. 3 in an unlocked and open position.
Figure 11:
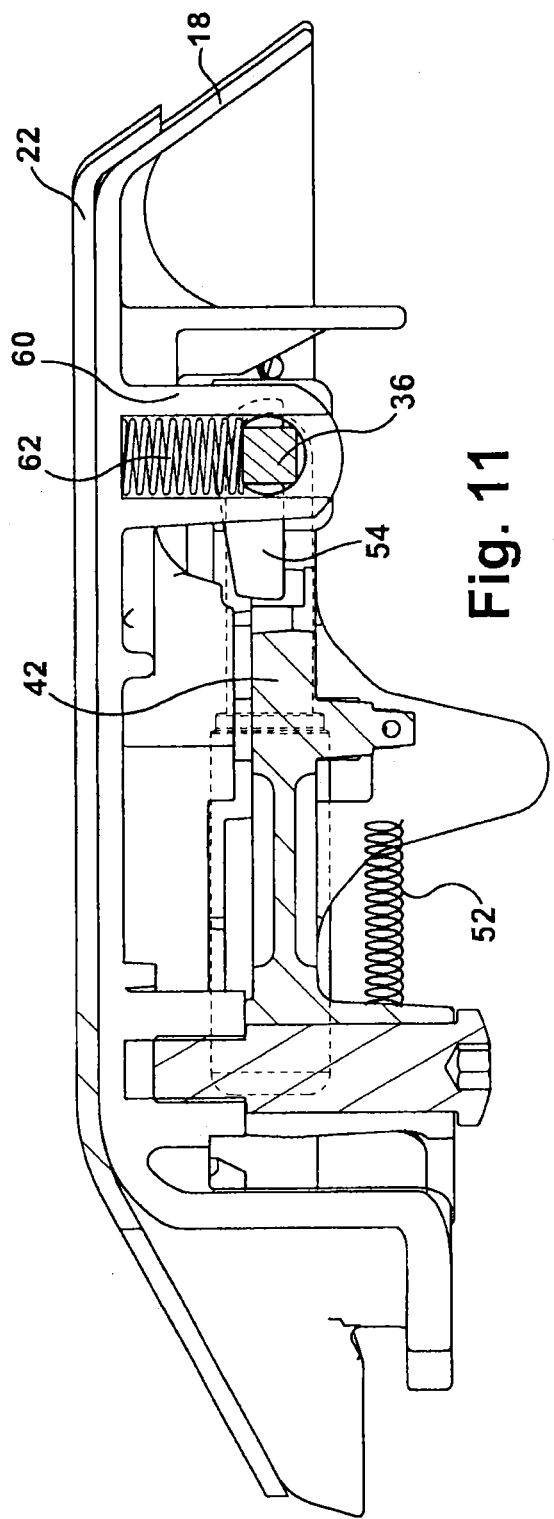
FIG. 11 is a cross-sectional side view of the retention system taken along lines 11-11 of FIG. 4 in a locked position.
Figure 12:
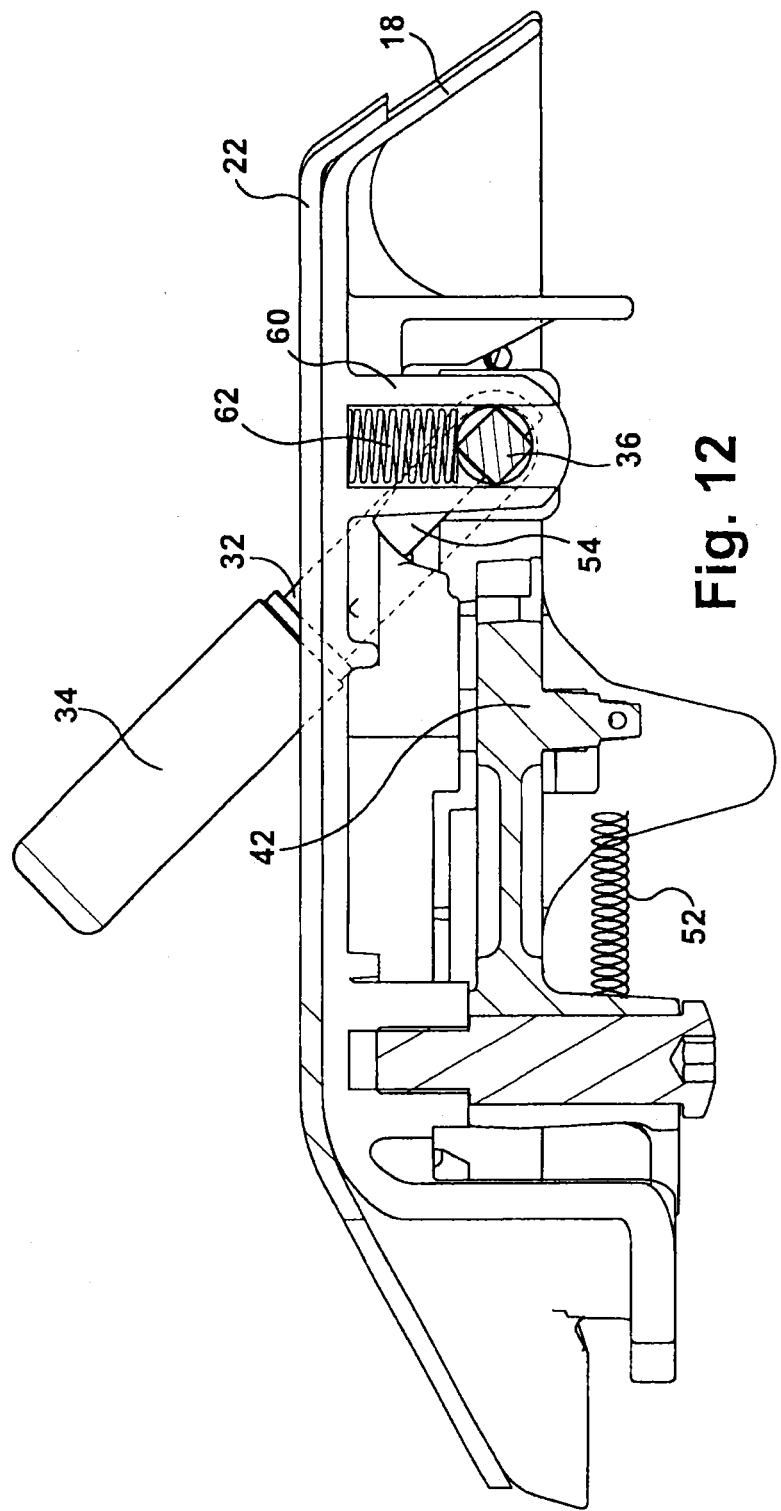
FIG. 12 is a cross-sectional side view of the retention system in a partially open position.

To open the retention system 30, the handle 32 may be rotated approximately ninety degrees upward, such as in the views depicted in FIGS. 7 and 8, to the "unlocked" position. This thereby moves the locking mechanism 54 out of the path of the second jaw 44 and may enable the handle 32 to be moved axially and the retention system 30 opened. The handle 32 may be rotated about the axis A, which is shown in FIGS. 2 and 3. While it is shown that the handle 32 may be rotated upward, it may alternatively be rotated in any direction by any suitable amount and should not be limited to that shown and described herein.

The skid plate 18 may include at least one protrusion 56. By way of a non-limiting example, the skid plate 18 may include a pair of protrusions 56. The protrusions 56 may be of any appropriate shape or size. These protrusions 56 may extend approximately perpendicularly out from the skid plate 18 towards the load bed of the vehicle. These protrusions 56 may form a channel 58 located therein.

Figure 6:
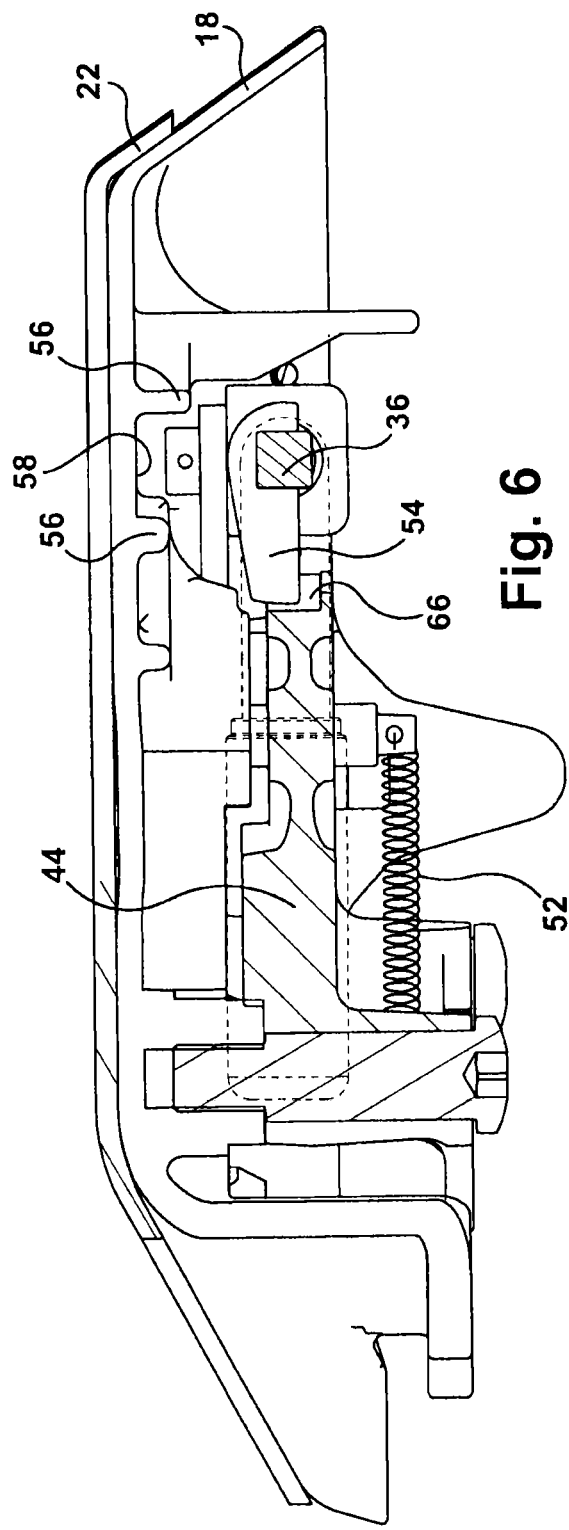
FIG. 6 is a cross-sectional side view of the retention system taken along lines 6-6 of FIG. 4.

The channel 58 may be of any appropriate shape, size, type or configuration. By way of a non-limiting example, the channel 58 may be of a generally rectangular shape. The channel 58 may be located at any appropriate position on the fifth wheel hitch assembly 10, such as located on an underside of the skid plate 18, which is shown in FIGS. 6 and 8. When the handle 32 is rotated ninety degrees (or the appropriate amount) and initially moved axially, the locking mechanism 54 may be retained within the channel 58, thereby not allowing the handle 32 to be rotated through for the full axial opening stroke. In this manner, channel 58 may limit the rotation of handle 32 to a range of axial positions.

The skid plate 18 may also include a boss 60. The boss 60 may be of any appropriate shape or size. The boss 60 may extend approximately perpendicularly out from the skid plate 18 towards the load bed of the vehicle. The boss 60 may house a spring 62. The spring 62 may be of any appropriate shape, size, type or configuration, such as a compression spring 62.

The compression spring 62 may be located at any appropriate position on the fifth wheel hitch assembly 10, such as within the boss 60. The compression spring 62 may, bias, push or cam against the mounting tube 36, thereby providing a positive reaction toward the open or closed position.

As an alternative, there may also be built in guides to keep the stop out of the retention system 30 when the king pin (not shown) is engaging or disengaging the fifth wheel hitch assembly 10, thereby preventing any unwanted rotation of the handle 32 while the king pin (not shown) is in the process of engaging or disengaging from the hitch assembly 10.

The jaws 42, 44 may self-close when the king pin (not shown) comes into contact with the jaws 42, 44. By way of a non-limiting example, to unlock the jaws 42, 44 the handle 32 may be rotated approximately ninety degrees about axis A. Once the jaws 42, 44 are unlocked, but still closed, the king pin (not shown) may push the jaws 42, 44 open, as the jaws 42, 44 may be spring loaded. Once the king pin enters the jaws 42, 44, the jaws 42, 44 may shut around the king pin(not shown), whereby the handle 32 may be rotated in the opposite direction about the axis A down to lock the jaws 42, 44. During this engagement, the king pin (not shown) may enter into or above the intermeshed gear teeth 48. The retention system 30 may operate even in an unlocked but closed position, whereby the king pin (not shown) may not be released from the jaws 42, 44.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A fifth wheel hitch comprising:
   a skid plate; and
   a retention system supported by said skid plate and operable to receive a coupling member of a towed vehicle to retain said coupling member within said retention system, wherein said retention system comprises:
   at least one jaw moveable between open and closed positions; and
   an actuating member axially moveable between first and second positions with movement of the at least one jaw between said open and closed positions, and said actuating member including a locking mechanism selectively rotatable between first and second rotational positions when said at least one jaw is in said closed position whereby said locking mechanism selectively engages a locking feature on said at least one jaw, wherein engagement of said locking mechanism with said locking feature maintains said retention system in a locked and closed position.

2. The fifth wheel hitch of claim 1, wherein said at least one jaw includes a pair of jaws meshed together and capable of moving together.

3. The fifth wheel hitch of claim 2, wherein said locking feature includes a notch capable of retaining said pair of jaws in said jaw closed position.

4. The fifth wheel hitch of claim 3, wherein said locking mechanism is selectively engageable with said notch to retain said retention system in said closed and locked position.

5. The fifth wheel hitch of claim 1, wherein said actuating member includes a lever attached to said skid plate and operable to move between said first and second positions, wherein said lever includes a first portion having a substantially circular cross-section and a second portion having a substantially acircular cross-section.

6. The fifth wheel hitch of claim 5, wherein said retention system includes at least one spring detent capable of engaging with a flat surface of said second portion of said lever in either of said first and second rotational positions.

7. The fifth wheel hitch of claim 5 further comprising a slider attached to said lever, said slider permitting rotation of said lever while holding said lever fixed about an axis.

8. The fifth wheel hitch of claim 1, wherein said actuating member is generally linearly-axially moveable relative to said skid plate to move said at least one jaw between said opened and closed positions.

9. A fifth wheel hitch comprising:
at least one support frame capable of being secured to a towing vehicle;
a skid plate attached to said at least one support frame; and
a retention system secured to said skid plate, said retention system comprising:
a handle;
a linkage attached to said handle, said linkage permitting rotation of said handle from a first position to a second position while said handle remains fixed about an axis; and
a jaw attached to said linkage, said jaw having an engaging feature wherein rotation of said handle to said second position permits movement of said jaw to a jaw open position, and rotation of said handle to said first position selectively engages said engaging feature of said jaw.

10. The fifth wheel hitch of claim 9, further comprising a second jaw wherein movement of said jaw controls movement of said second jaw.

11. The fifth wheel hitch of claim 9, wherein engaging said engaging feature of said jaw secures said jaw in a jaw closed position.

12. The fifth wheel hitch of claim 11, wherein said handle in said second position permits said handle to move axially selectively moving said jaw to said jaw closed position.

13. The fifth wheel hitch of claim 11, further comprising a locking mechanism secured to said handle, wherein said locking mechanism selectively engages said engaging feature of said jaw in said jaw closed position.

14. The fifth wheel hitch of claim 13, wherein said engaging feature includes a notch positioned on said jaw, wherein said locking mechanism is capable of engaging said notch to retain said jaw in said jaw closed position.

15. The fifth wheel hitch of claim 14, wherein the locking mechanism includes a tab configured to engage with said notch.

16. A retention system for a fifth wheel hitch assembly, said retention system comprising:
a handle;
a linkage operatively coupled to said handle, wherein said linkage allows rotation of said handle while restricting axial movement of said handle;
a mounting tube attached to said handle, said mounting tube capable of being secured to a skid plate of a fifth wheel hitch assembly;
a jaw having an engaging feature wherein said jaw is operatively coupled to said linkage; and
a locking mechanism fixed on said handle and in operative communication with said jaw, wherein said locking mechanism is selectively positionable from locked and unlocked positions, whereby said locking mechanism in said locked position engages said engaging feature of said jaw generally preventing movement of said jaw and said locking mechanism in said unlocked position disengages from said jaw.

17. The retention system of claim 16, further comprising a biasing member biasing said mounting tube causing said locking mechanism to be in one of said locked and unlocked positions.

18. The fifth wheel hitch of claim 17, wherein said biasing member inhibits rotation of said actuating member.

19. The fifth wheel hitch of claim 18, wherein said biasing member inhibits rotation of said actuating member in said locked position.

20. The fifth wheel hitch of claim 18, wherein said biasing member inhibits rotation of said actuating member in said unlocked position.

21. The fifth wheel hitch of claim 17, wherein said actuating member includes at least two flat surfaces whereby the biasing member engages one of said flat surfaces in said locked position and engages another of said flat surfaces in said unlocked position.

22. The retention system of claim 16, further comprising at least one biasing member operatively secured to said jaw, wherein said biasing member biases said jaw to a closed position.

23. The retention system of claim 16 wherein said locking mechanism comprises a tab secured to said handle that rotates upon rotation of said handle and said engaging feature includes a notch located on said jaw wherein said tab is capable of engaging said notch securing said jaw in said locked position.

24. The retention system of claim 16, wherein said jaw is capable of engaging a coupling member of a towed vehicle, wherein engagement of said coupling member with said jaw selectively positions said locking mechanism to said locked position.

25. A fifth wheel hitch comprising
a skid plate;
at least one jaw moveable between jaw open and closed positions, said jaw having a locking feature; and
an actuating member axially moveable between first and second positions to cause said at least one jaw to move between said jaw open and closed positions, said actuating member selectively rotatable between first and second rotational positions;
a locking mechanism fixed to said actuating member, wherein said at least one jaw being in said jaw closed position and said actuating member being in said second rotational position engages said locking mechanism with said locking feature locking said jaw in said jaw closed position; and
a biasing member operatively engaged with said actuating member inhibiting rotation of said actuating member between said first and second rotational positions.

26. A retention system for a fifth wheel hitch assembly, said retention system comprising:
a handle;
a linkage operatively coupled to said handle;

a mounting tube attached to said handle, said mounting tube capable of being secured to a skid plate of a fifth wheel hitch assembly;

a jaw having an engaging feature wherein said jaw is operatively coupled to said linkage;

a locking mechanism fixed on said handle and in operative communication with said jaw, wherein said locking mechanism is selectively positionable from locked and unlocked positions, whereby said locking mechanism in said locked position engages said engaging feature of said jaw generally preventing movement of said jaw and said locking mechanism in said unlocked position disengages from said jaw; and at least one biasing member operatively secured to said jaw, wherein said biasing member biases said jaw to a closed position.

27. A retention system for a fifth wheel hitch assembly, said retention system comprising:

a handle;

a linkage operatively coupled to said handle;

a mounting tube attached to said handle, said mounting tube capable of being secured to a skid plate of a fifth wheel hitch assembly;

a jaw having an engaging feature wherein said jaw is operatively coupled to said linkage;

a locking mechanism fixed on said handle and in operative communication with said jaw, wherein said locking mechanism is selectively positionable from locked and unlocked positions, whereby said locking mechanism in said locked position engages said engaging feature of said jaw generally preventing movement of said jaw and said locking mechanism in said unlocked position disengages from said jaw; and a biasing member biasing said mounting tube causing said locking mechanism to be in one of said locked and unlocked positions, wherein said biasing member inhibits rotation of said handle.

* * * * *